United States Patent
Garner, IV et al.

(10) Patent No.: US 10,896,673 B1
(45) Date of Patent: Jan. 19, 2021

(54) AUTHENTICATION OF IMPAIRED VOICES

(71) Applicant: Wells Fargo Bank, N.A., San Francisco, CA (US)

(72) Inventors: Andrew J. Garner, IV, State Road, NC (US); Tyua Larsen Fraser, Livermore, CA (US); Kimberly Ann MacInnis, San Francisco, CA (US); Paul R. McMahon, Dayton, MN (US); Darrell Lee Suen, San Ramon, CA (US); Zhong Wan, Pacifica, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 72 days.

(21) Appl. No.: 15/711,022

(22) Filed: Sep. 21, 2017

(51) Int. Cl.
| | | |
|---|---|---|
| *G10L 15/20* | (2006.01) | |
| *G10L 17/24* | (2013.01) | |
| *G06F 21/32* | (2013.01) | |
| *G10L 17/22* | (2013.01) | |
| *G10L 17/20* | (2013.01) | |
| *G10L 17/08* | (2013.01) | |

(52) U.S. Cl.
CPC .............. *G10L 15/20* (2013.01); *G06F 21/32* (2013.01); *G10L 17/20* (2013.01); *G10L 17/22* (2013.01); *G10L 17/24* (2013.01); *G10L 17/08* (2013.01)

(58) Field of Classification Search
CPC ......... G10L 17/02; G10L 17/08; G10L 17/20; G10L 17/22; G10L 15/20; G06F 21/32
USPC ........................................ 704/246, 247, 250
See application file for complete search history.

(56) References Cited

U.S. PATENT DOCUMENTS

| | | | | |
|---|---|---|---|---|
| 5,023,901 A * | 6/1991 | Sloan | ..................... | H04M 11/04 |
| | | | | 340/505 |
| 5,365,574 A * | 11/1994 | Hunt | ...................... | G06F 21/32 |
| | | | | 379/189 |
| 5,465,290 A * | 11/1995 | Hampton | ........... | G07C 9/00158 |
| | | | | 379/189 |
| 5,675,704 A | 10/1997 | Juang et al. | | |
| 5,752,231 A * | 5/1998 | Gammel | ................. | G10L 17/00 |
| | | | | 704/200 |
| 5,805,674 A * | 9/1998 | Anderson, Jr. | ... | H04W 12/1206 |
| | | | | 379/93.03 |
| 6,119,084 A * | 9/2000 | Roberts | ................... | G10L 17/20 |
| | | | | 704/243 |
| 6,266,640 B1 * | 7/2001 | Fromm | .................. | G06Q 20/40 |
| | | | | 235/380 |
| 6,401,063 B1 * | 6/2002 | Hebert | .................... | G10L 17/04 |
| | | | | 704/234 |
| 6,480,825 B1 * | 11/2002 | Sharma | .............. | G07C 9/00158 |
| | | | | 704/270 |

(Continued)

OTHER PUBLICATIONS

Kelly, Finnian, et al., "Speaker Verification with Long-Term Ageing Data", IEEE; Biometrics (ICB), 2012 5th IAPR International Conference, (2012), 6 pgs.

*Primary Examiner* — James S Wozniak
(74) *Attorney, Agent, or Firm* — Schwegman Lundberg & Woessner, P.A.

(57) ABSTRACT

Systems and techniques for authentication of impaired voices are described herein. A voice profile may be generated for a user. An audio stream may be received including an authentication voice of the user. It may be determined that the authentication voice does not match a first set of authentication criteria. The audio stream may be compared to a second set of authentication criteria. The user may be authenticated based on the comparison.

20 Claims, 7 Drawing Sheets

(56) References Cited

U.S. PATENT DOCUMENTS

| | | | |
|---|---|---|---|
| 6,519,561 B1* | 2/2003 | Farrell | G10L 15/07 |
| | | | 704/232 |
| 6,678,720 B1* | 1/2004 | Matsumoto | H04L 12/1813 |
| | | | 709/203 |
| 6,691,089 B1* | 2/2004 | Su | G06F 21/32 |
| | | | 704/244 |
| 7,054,819 B1* | 5/2006 | Loveland | G06F 21/32 |
| | | | 345/419 |
| 7,085,718 B2* | 8/2006 | Kemp | G10L 17/04 |
| | | | 704/244 |
| 7,409,343 B2 | 8/2008 | Charlet | |
| 7,529,670 B1 | 5/2009 | Michaelis | |
| 7,590,538 B2 | 9/2009 | St. John | |
| 8,209,174 B2 | 6/2012 | Al-telmissani | |
| 8,386,263 B2 | 2/2013 | Farrell et al. | |
| 8,620,657 B2 | 12/2013 | Farrell et al. | |
| 8,620,666 B1* | 12/2013 | Whitmore | H04M 1/271 |
| | | | 704/273 |
| 9,548,054 B2 | 1/2017 | Sun et al. | |
| 9,553,977 B2 | 1/2017 | Kulkarni | |
| 9,781,106 B1* | 10/2017 | Vitus | H04W 12/06 |
| 9,892,732 B1* | 2/2018 | Tian | G01S 3/80 |
| 10,027,662 B1* | 7/2018 | Mutagi | H04L 63/0861 |
| 10,063,542 B1* | 8/2018 | Kao | H04L 63/0861 |
| 2002/0143540 A1* | 10/2002 | Malayath | G10L 15/07 |
| | | | 704/255 |
| 2002/0194003 A1* | 12/2002 | Mozer | G06F 21/32 |
| | | | 704/270.1 |
| 2003/0154076 A1* | 8/2003 | Kemp | G10L 17/26 |
| | | | 704/236 |
| 2004/0107099 A1* | 6/2004 | Charlet | G10L 17/12 |
| | | | 704/234 |
| 2005/0171774 A1* | 8/2005 | Applebaum | G10L 17/06 |
| | | | 704/250 |
| 2006/0122837 A1* | 6/2006 | Kim | G10L 15/22 |
| | | | 704/270.1 |
| 2006/0188076 A1* | 8/2006 | Isenberg | H04M 3/385 |
| | | | 379/88.02 |
| 2006/0206724 A1* | 9/2006 | Schaufele | G06F 21/32 |
| | | | 713/186 |
| 2006/0285665 A1* | 12/2006 | Wasserblat | G10L 17/26 |
| | | | 379/114.14 |
| 2007/0071206 A1* | 3/2007 | Gainsboro | H04M 3/2281 |
| | | | 379/168 |
| 2007/0219801 A1* | 9/2007 | Sundaram | G10L 17/04 |
| | | | 704/270 |
| 2008/0195387 A1* | 8/2008 | Zigel | G10L 17/06 |
| | | | 704/236 |
| 2010/0027767 A1* | 2/2010 | Gilbert | H04M 3/385 |
| | | | 379/88.03 |
| 2010/0106502 A1* | 4/2010 | Farrell | G07C 9/00158 |
| | | | 704/246 |
| 2010/0268537 A1* | 10/2010 | Al-Telmissani | G10L 17/04 |
| | | | 704/246 |
| 2011/0202340 A1* | 8/2011 | Ariyaeeinia | G10L 17/12 |
| | | | 704/233 |
| 2011/0260832 A1* | 10/2011 | Ross | G06F 21/32 |
| | | | 340/5.84 |
| 2011/0320201 A1* | 12/2011 | Kaufman | G10L 17/04 |
| | | | 704/251 |
| 2012/0143608 A1 | 6/2012 | Kaufman | |
| 2013/0047232 A1* | 2/2013 | Tuchman | H04L 9/3226 |
| | | | 726/7 |
| 2013/0166301 A1* | 6/2013 | Daye | G10L 17/04 |
| | | | 704/247 |
| 2013/0304478 A1* | 11/2013 | Sun | G10L 17/04 |
| | | | 704/273 |
| 2013/0311190 A1* | 11/2013 | Reiner | G06Q 10/0639 |
| | | | 704/270 |
| 2014/0039897 A1* | 2/2014 | Kulkarni | G10L 17/22 |
| | | | 704/273 |
| 2014/0046664 A1* | 2/2014 | Sarkar | H04W 12/06 |
| | | | 704/246 |
| 2014/0172430 A1* | 6/2014 | Rutherford | G06Q 20/20 |
| | | | 704/273 |
| 2014/0188481 A1* | 7/2014 | Kulkarni | G10L 17/00 |
| | | | 704/273 |
| 2014/0278389 A1 | 9/2014 | Zurek et al. | |
| 2014/0366128 A1* | 12/2014 | Venkateswaran | H04L 63/08 |
| | | | 726/19 |
| 2015/0025888 A1* | 1/2015 | Sharp | G10L 17/00 |
| | | | 704/246 |
| 2015/0067822 A1* | 3/2015 | Randall | G06F 21/32 |
| | | | 726/17 |
| 2015/0081295 A1* | 3/2015 | Yun | G10L 17/005 |
| | | | 704/236 |
| 2015/0112682 A1* | 4/2015 | Rodriguez | G10L 17/06 |
| | | | 704/249 |
| 2015/0161370 A1* | 6/2015 | North | G07C 9/00158 |
| | | | 726/5 |
| 2015/0301796 A1* | 10/2015 | Visser | G06F 3/167 |
| | | | 715/728 |
| 2015/0332671 A1* | 11/2015 | Arndt | G10L 25/63 |
| | | | 704/244 |
| 2015/0371639 A1* | 12/2015 | Foerster | G10L 17/22 |
| | | | 704/233 |
| 2015/0381787 A1* | 12/2015 | Babayev | H04M 1/271 |
| | | | 455/563 |
| 2016/0294837 A1* | 10/2016 | Turgeman | H04L 63/102 |
| 2016/0316366 A1* | 10/2016 | Takenouchi | H04W 12/06 |
| 2016/0379622 A1* | 12/2016 | Patel | G10L 13/06 |
| | | | 704/260 |
| 2017/0092276 A1* | 3/2017 | Sun | G10L 15/30 |
| 2017/0111497 A1* | 4/2017 | Starr | H04M 3/42042 |
| 2017/0140760 A1* | 5/2017 | Sachdev | G10L 17/04 |
| 2018/0152445 A1* | 5/2018 | Ye | H04W 12/06 |
| 2018/0254046 A1* | 9/2018 | Khoury | G10L 17/02 |
| 2018/0260550 A1* | 9/2018 | Shin | G06F 21/31 |
| 2019/0012444 A1* | 1/2019 | Lesso | G06F 21/32 |
| 2019/0013033 A1* | 1/2019 | Bhimanaik | G10L 25/51 |

\* cited by examiner

US 10,896,673 B1

AUTHENTICATION OF IMPAIRED VOICES

TECHNICAL FIELD

Embodiments described herein generally relate to voice enabled authentication and, in some embodiments, more specifically to voice enabled authentication for impaired voices.

BACKGROUND

Users of voice-enabled systems may be authenticated using voice. A user may request access to a secured resource and the voice of the user may be compared to a reference voice recorded previously. The user may be authenticated upon determination that characteristics of the current voice match the characteristics of the reference voice. The user may then be allowed access to the secured resource.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
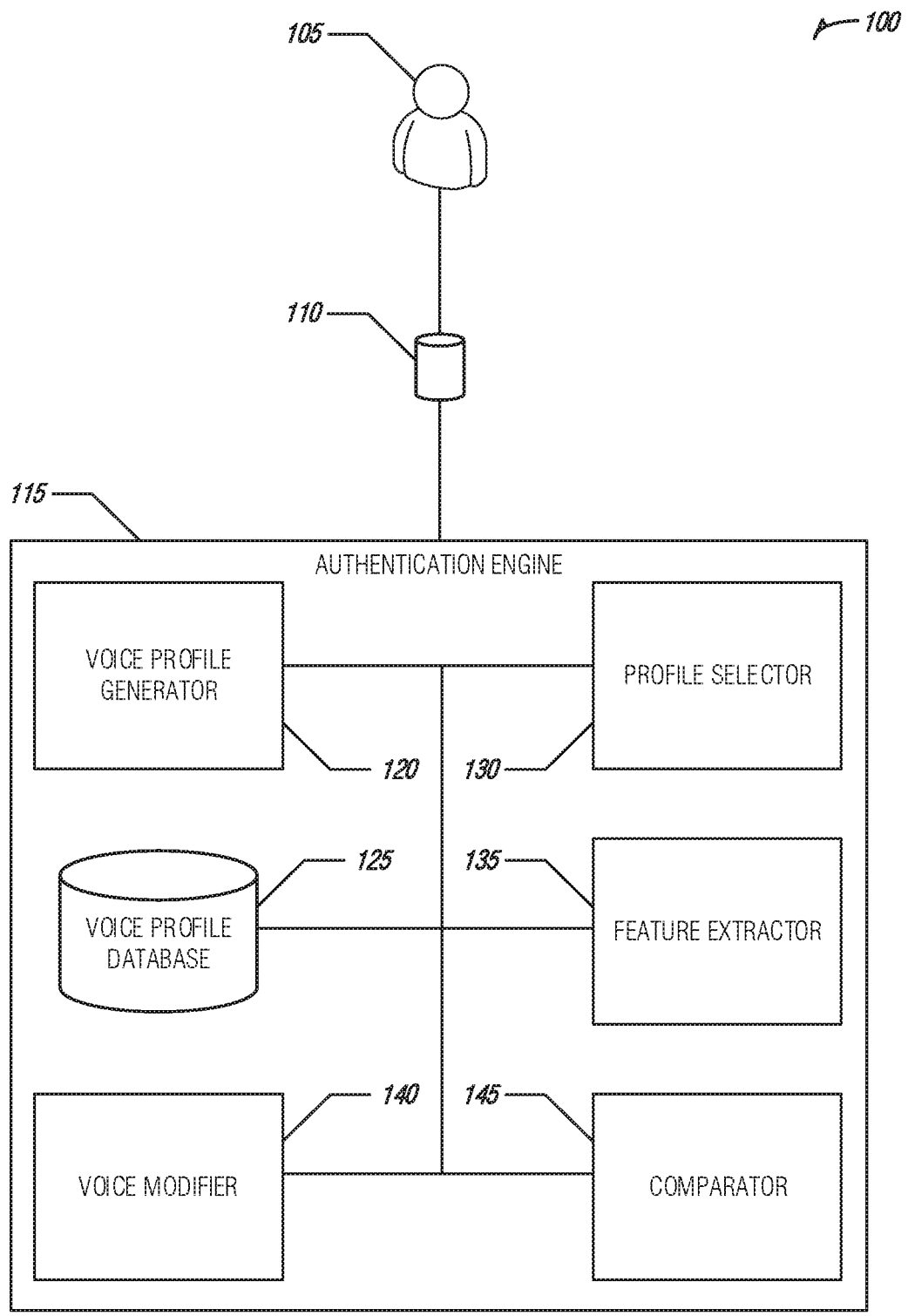
FIG. 1 is a block diagram of an example of an environment and a system for authentication of impaired voices, according to an embodiment.

The increasing use of voice-enabled systems (e.g., interactive voice response, voice-enabled personal assistants, etc.) provides an opportunity for seamless computing system interaction by users using natural language. Voice-enabled systems may allow users to access information in a more natural manner by speaking to a system in a manner similar to how a user would interact with another person. Voice-based authentication may be used to authenticate users requesting access to secured resources. Authenticating the voice of the user may allow access to the secured resources without disrupting the natural conversational flow between the user and the voice-enabled system.

The user may have previously created a voice profile for the system (e.g., via a voice training session, through initial use of the system, etc.). The voice profile may be created by the system from an audio stream recorded including the voice of the user. The voice profile may include a voice print (e.g., a unique identifier based on the spectrogram of the voice of the user), audio features of the voice of the user (e.g., tone, timbre, amplitude, frequency, etc.), and other characteristics representing the uniqueness of the voice of the user. The voice profile may be included in a user profile for the user. The user profile may include non-voice features such as demographic information, audio elements observed in an audio stream including the voice of the user, device identifiers for devices of the user, etc.

The user may request secured information (e.g., financial information, personal information, etc.) from the voice enabled system and the currently presented voice of the user may be compared to the voice profile. The currently presented voice may be considered to be an authentication voice of the user. The user may be granted access to the secured information if the authentication voice of the user matches the voice profile.

However, voice may change periodically due to illness, etc. or over time due to age, etc. These changes may cause the speaking voice of the user to be impaired by presenting different audio characteristics (e.g., tone, timbre, amplitude, etc.) than the previously known speaking voice of the user (e.g., as represented in a previously created voice profile, etc.). Changes in the voice of the user may disrupt the voice authentication process because the voice of the user may change enough that the voice of the user no longer matches the voice profile (e.g., the user now has an impaired voice). A solution may be to have the user recreate the voice profile with the new voice. However, recreating a voice profile each time the user has a cold, or periodically as the voice changes, may cause the user to disengage with the voice-enabled system because some of the convenience may be lost.

Another solution may be to use additional authentication criteria to authenticate the user. For example, the impaired voice of the user may be similar to the voice profile although still not determined to be a match and additional criteria may be used to verify that the voice is the voice from the voice profile. The voice profile may then be updated based on the impaired voice so that future authentication requests may match the voice profile. A variety of additional criteria may be used to verify that a current voice is that of a voice included in the voice profile. By way of example and not limitation, the additional criteria may include non-voice audio elements from an audio stream including the reference voice (e.g., environmental noises, etc.), an identifier transmitted to a device of the user (e.g., an inaudible tone pattern, etc.), geolocation information, characteristics of a filtered version of the voice profile, characteristics of an alternate voice profile, an authentication element, demographic information such as gender, ethnicity, spoken languages, accents, etc. may be used as criteria for authenticating the user with an impaired voice. Thus, a voice used in an authentication request may be validated for the user in instances where the voice is not a match to a voice profile of the user. The voice profile of the user may be automatically updated upon validation so that future authentication requests may be completed with reduced processing. Therefore, the user may continue to interact with the voice-enabled system seamlessly without having to go through a manual voice profile recreation session.

The techniques discussed herein may accommodate a user with a temporary or permanent voice disability, allowing the users to continue to interact with the system. The system may automatically detect a shift or change in the voice of the user. For example, the user may be suffering from a cold which has caused a sore throat and a stuffy nose. The voice of the user in this context may be sufficiently altered that they may fail authentication with their normal voice profile. Such voice comparison may, however, yield results that are close to successful, but fall just short of a successful "base" authentication threshold.

For such situations (e.g., "near-misses"), one or more "secondary" authentication thresholds, that may be broader or less restrictive than the base authentication threshold, may be used to determine that, although the speaker did not pass authentication under the base threshold (and thus is not suitable for voice-based authentication), the speaker's voice sample was close enough to the initial voice profile or other non-voice authentication data of the user may be sufficiently strong that the speaker may be the authentic user with an impaired voice.

When it is determined that the speaker may be the user, but with an impaired voice, an ancillary authentication method may be invoked (e.g., to temporarily replace the voice authentication component) temporarily authenticating the speaker as the user. Once authenticated, the user may be allowed to configure an "alternate" voice profile using their current voice. As such, the user may establish an additional voice profile with the system. Later, when the user attempts to authenticate, the system may compare the sample to any or all of the voice profiles stored for the user (e.g., their initial voice profile, and their altered voice profile). As such, while the user is suffering from the same or similar condition, the user may continue to voice-authenticate with the system.

For certain types of impairments, certain aspects of the voice sample may change in particular ways. The system may look at differences in, by way of example and not limitation, pitch, tone, timber, cadence, language usage, etc. to compare the current sample to the initial voice profile. In some embodiments, the system may synthesize what the user would sound like under certain conditions (e.g., stuffy, hoarse, laryngitis, cold, etc.) by passing their initial voice profile through various filters. The resultant "synthetic" voice profiles may be used to determine whether the user is suffering from a particular condition.

In some embodiments, the new voice profile may be automatically added or the existing profile updated using passively-captured voice samples of the user (e.g., through an always on connected device with a microphone, mobile device, etc.). For example, samples of the user may be captured in the morning when they first wake up and exhibit a condition (e.g., stuffy, hoarse, etc.). The samples may be compared to the initial voice sample of the user to determine that the sample is close but demonstrates some differences. As such, an alternate voice profile may be created on behalf of the user under their current condition. Such passive samples may be "trusted" based on their source (e.g., knowing the sample originated from a known user device, etc.).

FIG. 1 is a block diagram of an example of an environment 100 and a system 115 for authentication of impaired voices, according to an embodiment. The system 100 may include a user 105 that may be interacting with a device (e.g., voice-enabled personal assistant, smartphone, tablet, computing device, etc.) 110. The device 110 may be communicatively coupled (e.g., via the internet, wired network, wireless network, shared bus, etc.) to an authentication engine 115. The authentication engine 115 may include a voice profile generator 120, a voice profile database 125, a profile selector 130, a feature extractor 135, a voice modifier 140, and a comparator 145.

The user 105 may interact with the device 110 and may initiate a voice profile creation session (e.g., by initial activation of the device 110, manually requesting profile creation, etc.). An audio stream including the voice of the user 105 may be transmitted to the authentication engine 115. The voice profile generator may evaluate the voice of the user 105 and generate a voice profile for the user 105. The voice profile may include acoustical properties of an initial voice of the user 105. For example, a voiceprint (e.g., similar to a fingerprint, etc.) may be created using pitch, tone, etc. of the voice of the user 105 based on an evaluation of the audio stream including the voice of the user 105.

The voice profile generator 120 may work in conjunction with the feature extractor 135 to extract features from the audio stream including the voice of the user. For example, the feature extractor 135 may extract non-voice audio (e.g., environmental noises, etc.) from the audio stream including the voice of the user. The feature extractor 135 may also gather data from the device 110 providing the audio stream of the voice of the user. For example, geolocation data, device id, time and date information, etc. may be gathered. The voice profile generator 120 may include the data gathered and extracted as metadata for the voiceprint of the user 105. The voice profile may be stored in the voice profile database 125.

After the voice profile is created the user 105 may continue to interact with the device HO. The user 105 may request secured information and the device 110 may transmit an audio stream of the request to the authentication engine 115. The authentication engine 115 may receive the audio stream including an authentication voice of the user 105 (e.g., the current voice of the user 105). The profile selector 130 may select a voice profile from the voice profile database 125 for evaluation of the authentication voice. In an example, the voice profile may be selected based on an association between the voice profile and the device 110. In another example, the voice profile may be selected based on matching characteristics of the authentication voice to characteristics included in the voice profiles.

The feature extractor 135 may extract features from the audio stream including the authentication voice. For example, the feature extractor 135 may create a voiceprint for the authentication voice. In another example, audio characteristics such as, for example, pitch, tone, cadence, etc. may be extracted from the authentication voice included in the audio stream. The comparator 145 may compare the authentication voice (e.g., using the voiceprint, extracted features, etc.) to a first set of authentication criteria (e.g., reference voiceprint, features extracted from the initial voice, etc.). In an example, the first set of authentication criteria may include acoustical properties of the initial voice of the user 105 used to generate the voice profile. The comparator 145 may determine that the authentication voice does not match the first set of authentication criteria. For example, the tone, timbre, and cadence may be compared and, because the user 105 has a cold, the tone and timbre may be different than that of the voice profile and as a result it may be determined that the authentication voice does not match the voice profile.

In response to determining that the authentication voice does not match the voice profile, the comparator 145 may compare the authentication voice to a second set of authentication criteria. In an example, the second set of authentication criteria may include a pitch, tone, timber, cadence, and language usage included in the initial voice of the user 105. The authentication engine 115 may authenticate the user 105 upon positive comparison between the audio stream and the second set of authentication criteria. In an example, the feature extractor 135 may extract non-voice features from the audio stream and the non-voice features may be compared by the comparator 145 to a set of non-voice features included in the voice profile. For example, the audio used to generate the voice profile may have included a variety of environmental noises such as, for example, the call of a particular species of bird, a whirring sound, a train whistle, a child playing, a dog barking, line static, etc. The environmental noises may be extracted by the feature extractor 135 and stored with the voice profile and may be included in the second set of authentication criteria. The feature extractor 135 may extract similar features from the audio stream including the authentication voice and the comparator 145 may compare the features to determine that the authentication voice is the voice included in the voice profile. As a result, the authentication engine 115 may authenticate the user 105.

In another example, an inaudible tone pattern (e.g., a tone pattern that may not be heard by humans, etc) may be transmitted to a device (e.g., other than device 110) of the user 105. The inaudible tone pattern may be included in the second set of authentication criteria. For example, the device 110 may be a voice-enabled personal assistant and the inaudible tone pattern may be transmitted to a smartphone (not shown) of the user 105. The transmitted inaudible tone pattern may be captured by a microphone in the device 110 and transmitted to the authentication engine 115. The comparator 145 may compare the received inaudible tone pattern and the transmitted tone pattern to determine that the authentication voice is the voice in the voice profile because the inaudible tone pattern transmitted to a second know device of the user 105 was received by the device 110. In response, the authentication engine 115 may authenticate the user 105.

In another example, a secondary authentication request may be transmitted to the user 105. For example, a pin number may be transmitted to a smartphone of the user 105. A response may be received to the secondary authentication request and the user 105 may be authenticated upon the comparator 145 validating the response to the secondary authentication request. For example, the user 105 may speak the pin number or enter the pin number as text (e.g., via a mobile application, etc.) and may be authenticated upon the comparator 145 determining that the response matches the transmitted pin number.

In yet another example, a voice filter may be identified based on features extracted from the authentication voice by the feature extractor 135. For example, the features of the authentication voice may indicate that the authentication voice may be a voice of a person with a cold and a cold voice filter may be selected. The voice filter may be applied to the initial voice of the user 105 by the voice modifier 140 and a set of acoustical properties may be extracted from the filtered initial voice of the user 105 by the feature extractor 135. The second set of authentication criteria may include the set of acoustical properties. The comparator 145 may compare the authentication voice to the set of acoustical properties extracted from the filtered initial voice of the user 105 and the user 105 may be authenticated upon a positive comparison.

In yet another example, the user 105 may opt-in to always-on voice monitoring. The authentication engine 115 may collect voice data of the user 105 over time and changes may be identified between the initial voice and the voice data collected over time. The second set of authentication criteria may include the identified changes. For example, a change in pitch of the voice of the user 105 may have been observed over time and the pitch change (e.g., the new pitch) may be included in the second set of authentication criteria. In an example, an alternate voice profile may be generated for the user 105 using the initial voice and the identified changes and the first authentication criteria may include acoustical properties of the alternate voice profile. In an example, the user 105 may have multiple voice profiles. For example, the user 105 may have been observed with laryngitis, a cold, and a hoarse throat. A voice profile may have been generated for each condition of the user 105 and the second set of authentication criteria may include features of each of the voice profiles of the user 105.

The authentication engine 115 may further safeguard secure information by providing differing levels of access to information based on how similar the comparator 145 determines the authentication voice to be to the initial voice. In an example, the authentication engine 115 may determine an authentication level for the user 105 based on the comparison of the comparator 145 between the authentication voice and the second set of authentication criteria. The authentication level may be determined based on a number of members of the second set of authentication criteria identified in the authentication voice. In an example, initial content may be selected for the user 105 based on the authentication level. The initial selected content may include a secondary authentication mechanism when the authentication level is below a threshold. For example, only basic (e.g., low security) information may be provided to the user 105 such as, for example, the user name and an account type description. The user 105 may then be provided with a secondary authentication mechanism such as a request for username and password, etc. Additional content may be selected for the user 105 upon determining the authenticity of the user 105 via the secondary authentication mechanism. For example, the remainder of the account information of the user 105 may be provided upon the user 105 submitting a correct username and password.

Each of the techniques discussed may culminate in the creation of an alternate voice profile for the user 105 upon successful authentication. The alternate voice profile may be used to create the first set of authentication criteria (e.g., while the user 105 is still experiencing the condition, etc.) or to create the second set of authentication criteria (e.g., after it has been determined that the voice of the user 105 no longer matched the alternate voice profile, etc.). Thus, the authentication engine 115 may use one or more voice profiles of the user 105 in authenticating the authentication voice of the user 105. Thus, as the voice condition of the user 105 changes, authentication may be completed with little additional input from the user 105.

Figure 7:
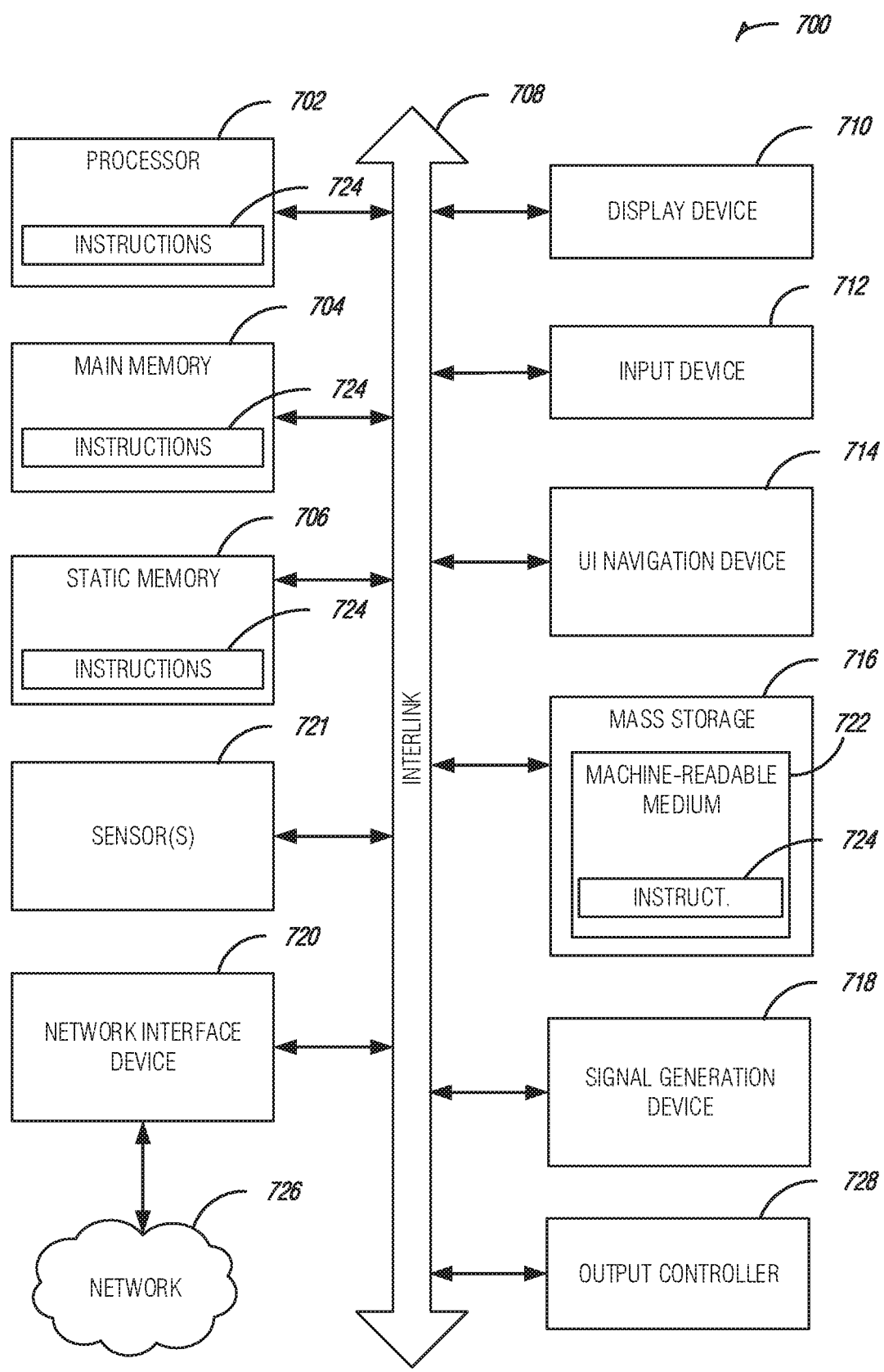
FIG. 7 is a block diagram illustrating an example of a machine upon which one or more embodiments may be implemented.

The authentication engine 115 the voice profile generator 120, the profile selector 130, the feature extractor 135, the voice modifier 140, and the comparator 145 may comprise one or more processors (e.g., hardware processor 702 described in FIG. 7, etc.) that execute software instructions, such as those used to define a software or computer program, stored in a computer-readable storage medium such as a memory device (e.g., a main memory 704 and a static memory 706 as described in FIG. 7, a Flash memory, random access memory (RAM), or any other type of volatile or non-volatile memory that stores instructions), or a storage device (e.g., a disk drive, or an optical drive). The components may be implemented in one or more computing devices (e.g., a single computer, multiple computers, a cloud computing platform, a virtual computing platform, etc.). Alternatively, the authentication engine 115, the voice profile generator 120, the profile selector 130, the feature extractor 135, the voice modifier 140, and the comparator 145 may, comprise dedicated hardware, such as one or more integrated circuits, one or more Application Specific integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Figure 2:
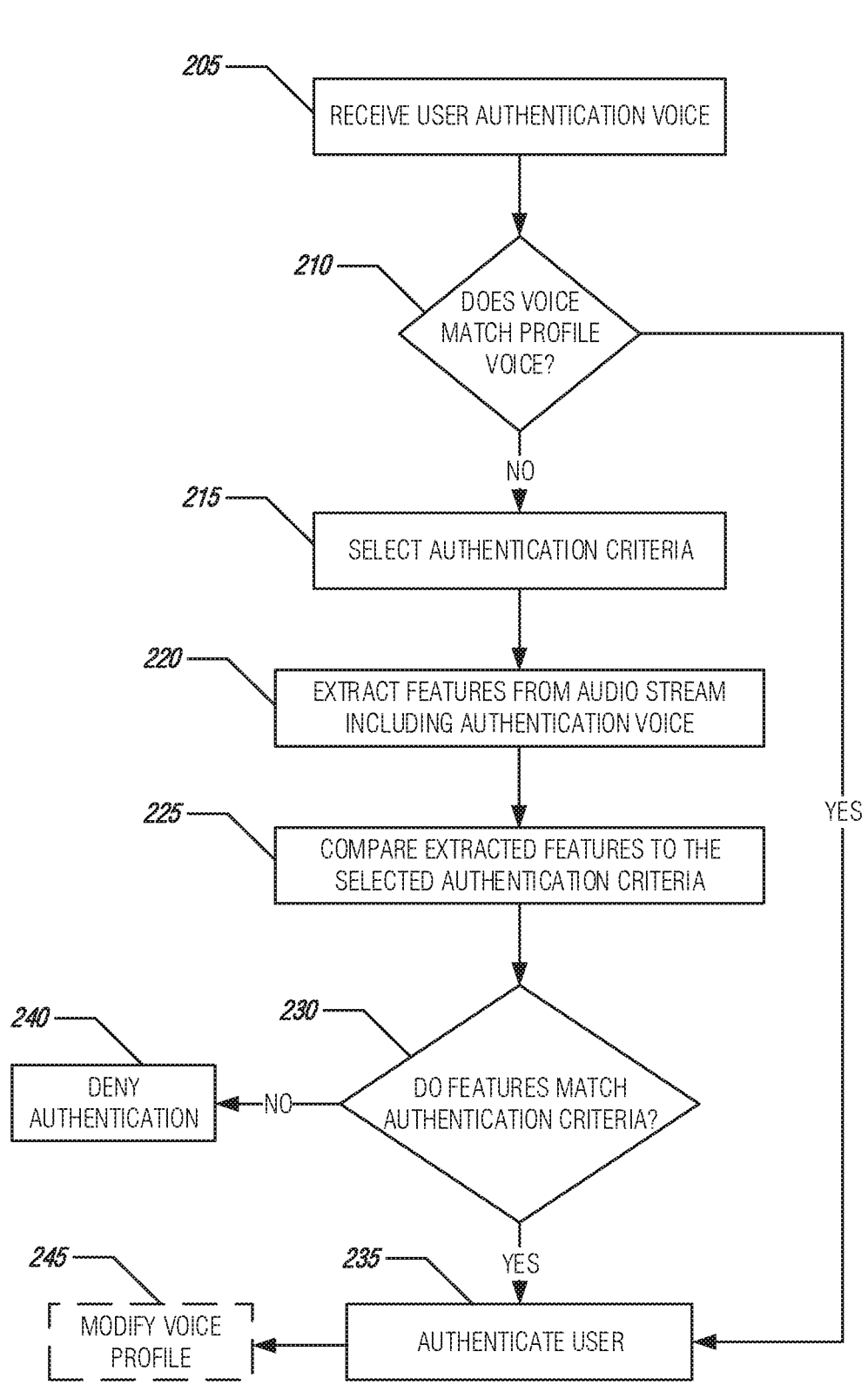
FIG. 2 illustrates a flow diagram of an example of a process for authentication of impaired voices using extracted features, according to an embodiment.

FIG. 2 illustrates a flow diagram of an example of a process 200 for authentication of impaired voices using extracted features, according to an embodiment. The process 200 may provide features as described in FIG. 1. An authentication voice of a user may be received (e.g., at operation 205). It may be determined in the authentication voice matches a voice profile of the user (e.g., at decision 210). For example, features (e.g., tone, timbre, cadence, etc.) of the voice included in the voice profile may be compared to features extracted from the authentication voice.

If the authentication voice matches the voice profile, the user may be authenticated (e.g., at operation 235). If the authentication voice does not match the voice profile, authentication criteria may be selected (e.g., at operation 215). For example, a second set of authentication criteria including geolocation, non-voice audio features, etc. may be selected. Features may be extracted from an audio stream including the authentication voice (e.g., at operation 220). For example, non-voice audio and metadata (e.g., geolocation data, time and date information, device id, etc.) may be extracted from the audio stream.

The features extracted from the audio stream may be compared to the authentication criteria (e.g., at operation 230). If the extracted features do not match the authentication criteria, authentication may be denied (e.g., at operation 240). In an example, an additional set of authentication criteria may be selected to validate the user. If it is determined that the extracted features match the authentication criteria, the user may be authenticated (e.g., at operation 235). For example, the geolocation data may indicate that the audio stream including the authentication voice matches a residence location of the user and the device id may indicate the audio stream was received from a known device of the user.

Figure 3:
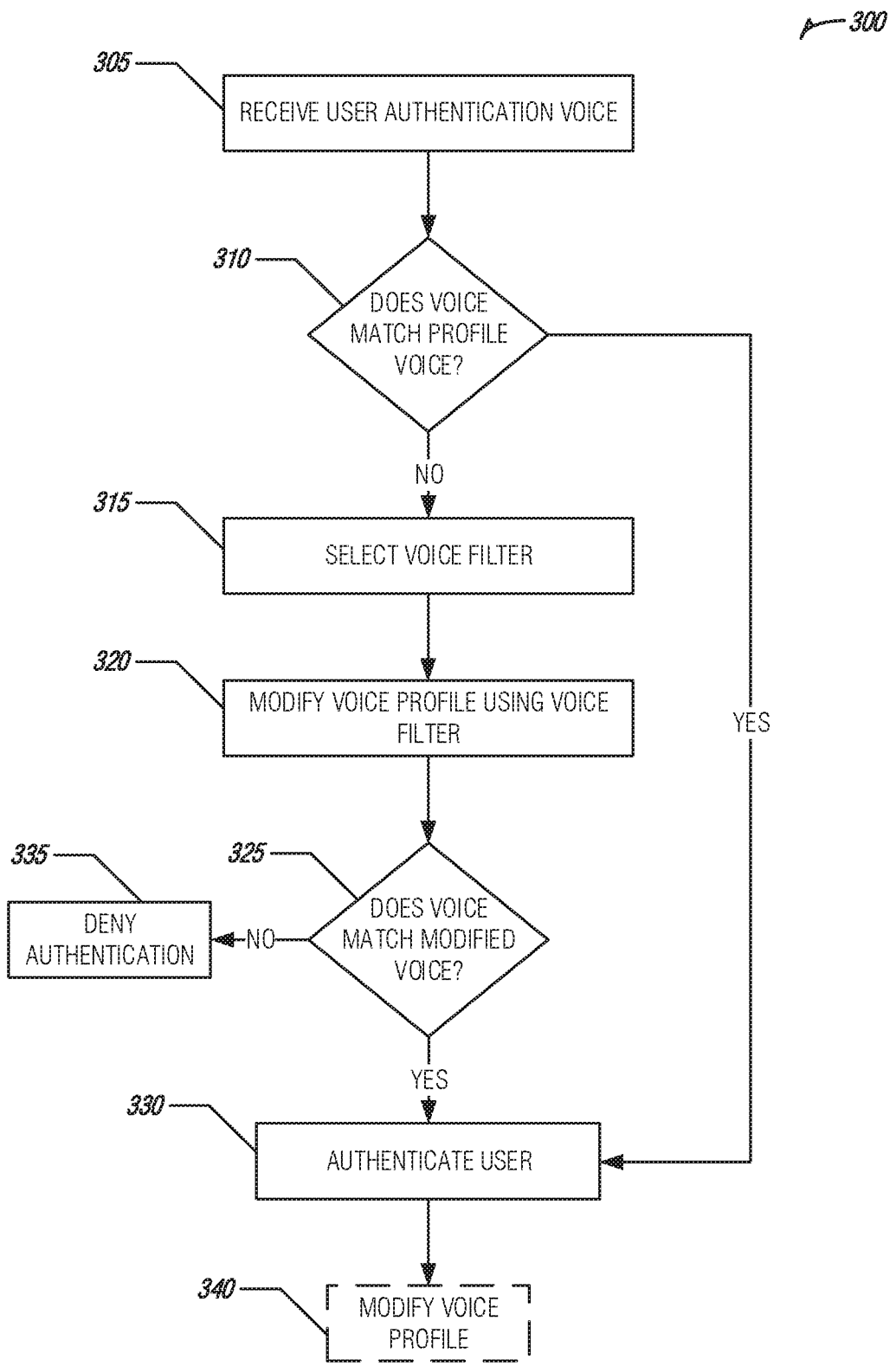
FIG. 3 it a flow diagram of an example of a process for authentication of impaired voices using a voice filter, according to an embodiment.

In an example, upon authentication of the user, the voice profile of the user may be modified or an alternate voice profile may be generated for the user (e.g., at operation 245). For example, the timber of the authentication voice may match the voice profile of the user, but the tone and cadence of the authentication voice did not match the voice profile. An alternate voice profile may be generated for the user based on the authentication voice upon authentication of the user using the geolocation and device id. Future authentication requests from the user may compare the authentication voice to the alternate voice profile until the authentication voice no longer matches the alternate voice profile. Thus, the voice profile may be modified or additional voice profiles may be added as the voice of the user changes. This may allow the authentication system to evolve as the user experiences vocal changes, FIG. 3 illustrates a flow diagram of an example of a process 300 for authentication of impaired voices using a voice filter, according to an embodiment. The process 300 may provide features as described in FIG. 1. An authentication voice of a user may be received (e.g., at operation 305). It may be determined in the authentication voice matches a voice profile of the user (e.g., at decision 310). For example, features (e.g., tone, timbre, cadence, etc.) of the voice included in the voice profile may be compared to features extracted from the authentication voice.

If the authentication voice matches the voice profile, the user may be authenticated (e.g., at operation 330). If the authentication voice does not match the voice profile, a voice filter may be selected (e.g., at operation 315). The voice filter may be selected based on characteristics of the authentication voice. A variety of voice filters may be stored for conditions such as, for example, a common cold, laryngitis, hoarse throat, tracheotomy, etc. Features may be extracted from the authentication voice and compared to features of the voice filters to select a voice filter that most closely matches characteristics of the authentication voice. For example, a voice filter for a user with a cold may include a feature indicative of nasal congestion while a voice filter for a user with laryngitis may include features indicative of a loss of vocal amplitude.

The voice include in the voice profile may be modified using the voice filter (e.g., at operation 320). For example, the pitch and timbre of the voice of the user in the voice profile may be modified by applying the voice filter. Features may then be extracted from the modified voice of the voice profile of the user and compared to determine if the authentication voice matches the modified voice (e.g., at operation 325), If it is determined that the authentication voice does not match the modified voice, the authentication request may be denied (e.g., at operation 335). In an example, another set of authentication criteria may be selected for evaluation of the authentication voice. If it is determined that the authentication voice matches the modified voice, the user may be authenticated (e.g., at operation 330).

In an example, upon authentication of the user, the voice profile of the user may be modified or an alternate voice profile may be generated for the user (e.g., at operation 340). For example, the timber of the authentication voice may match the voice profile of the user, but the tone and cadence of the authentication voice did not match the voice profile. An alternate voice profile may be generated for the user based on the authentication voice upon authentication of the user using modified voice. Future authentication requests from the user may compare the authentication voice to the alternate voice profile until the authentication voice no longer matches the alternate voice profile. Thus, the voice profile may be modified or additional voice profiles may be added as the voice of the user changes. This may allow the authentication system to evolve as the user experiences vocal changes.

Figure 4:
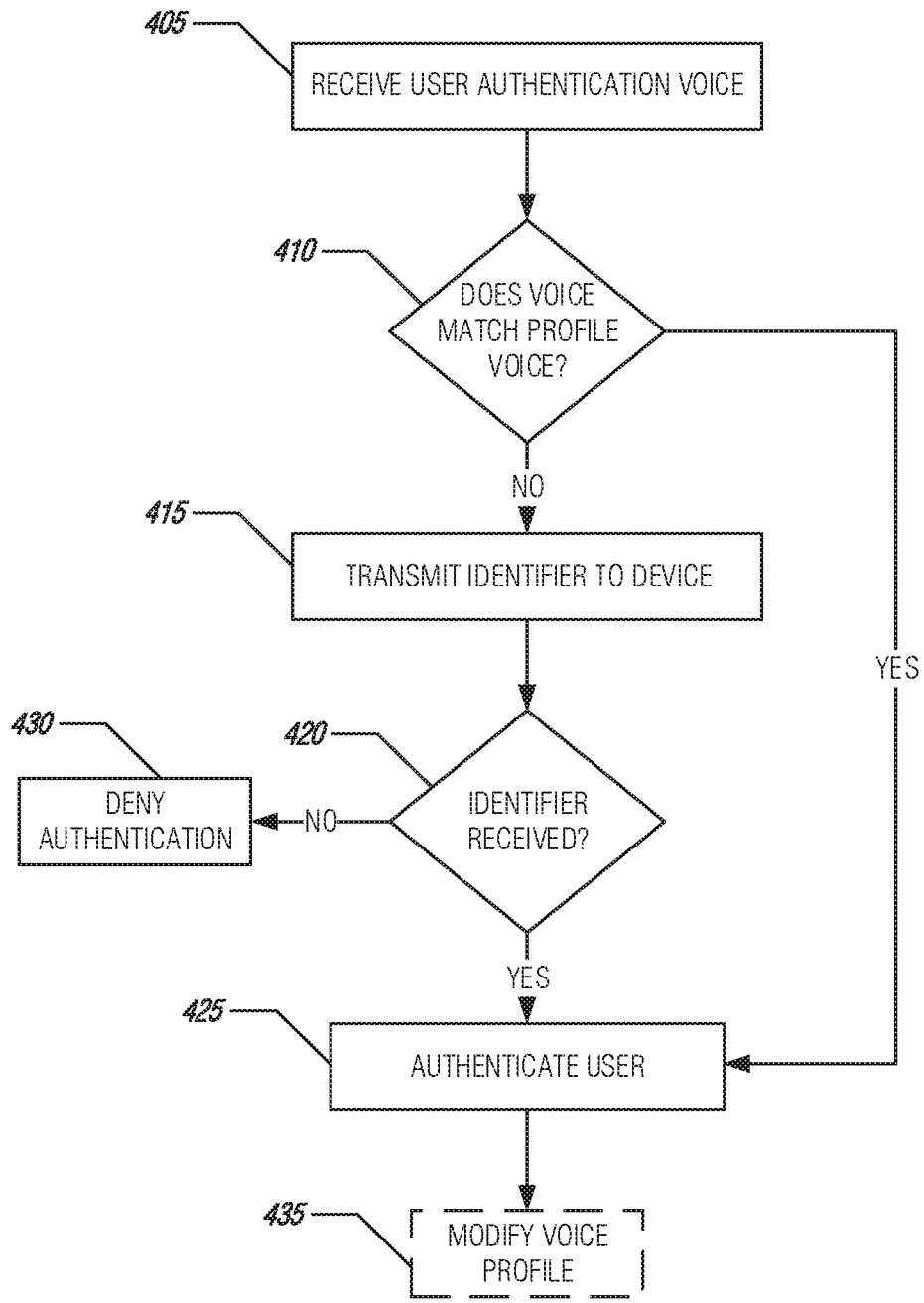
FIG. 4 illustrates a flow diagram of an example of a process for authentication of impaired voices using an identifier, according to an embodiment.

FIG. 4 illustrates a flow diagram of an example of a process 400 for authentication of impaired voices using an identifier, according to an embodiment. The process 400 may provide features as described in FIG. 1. An authentication voice of a user may be received (e.g., at operation 405). It may be determined in the authentication voice matches a voice profile of the user (e.g., at decision 410). For example, features (e.g., tone, timbre, cadence, etc.) of the voice included in the voice profile may be compared to features extracted from the authentication voice.

If the authentication voice matches the voice profile, the user may be authenticated (e.g., at operation 425). If the authentication voice does not match the voice profile, an identifier may be transmitted to a device of the user (e.g., at operation 415). For example, the user may be interacting with a smartphone and an inaudible tone pattern may be transmitted to a voice-enabled personal assistant associated with the user. In another example, the user may be interacting with the voice-enable personal assistant device and a pin number may be transmitted to the smartphone of the user (e.g., through a mobile application, text message, etc.).

It may be determined if the identifier has been received (e.g., at operation 420). For example, it may be determined if a microphone of the smartphone received the inaudible tone pattern transmitted to the voice-enabled personal assistant device. In another example, it may be determined if the user a spoken the pin number or entered the pin number in a mobile application, etc. that was transmitted to the smartphone. If it is determined that the identifier has not been received, the authentication request may be denied (e.g., at operation 430). In an example, another set of authentication criteria may be selected for authenticating the user. If it is determined that the identifier was received, the user may be authenticated (e.g., at operation 425).

In an example, upon authentication of the user, the voice profile of the user may be modified or an alternate voice profile may be generated for the user (e.g., at operation 435). For example, the timber of the authentication voice may match the voice profile of the user, but the tone and cadence of the authentication voice did not match the voice profile. An alternate voice profile may be generated for the user based on the authentication voice upon authentication of the user using the identifier. Future authentication requests from the user may compare the authentication voice to the alternate voice profile until the authentication voice no longer matches the alternate voice profile. Thus, the voice profile may be modified or additional voice profiles may be added as the voice of the user changes. This may allow the authentication system to evolve as the user experiences vocal changes.

Figure 5:
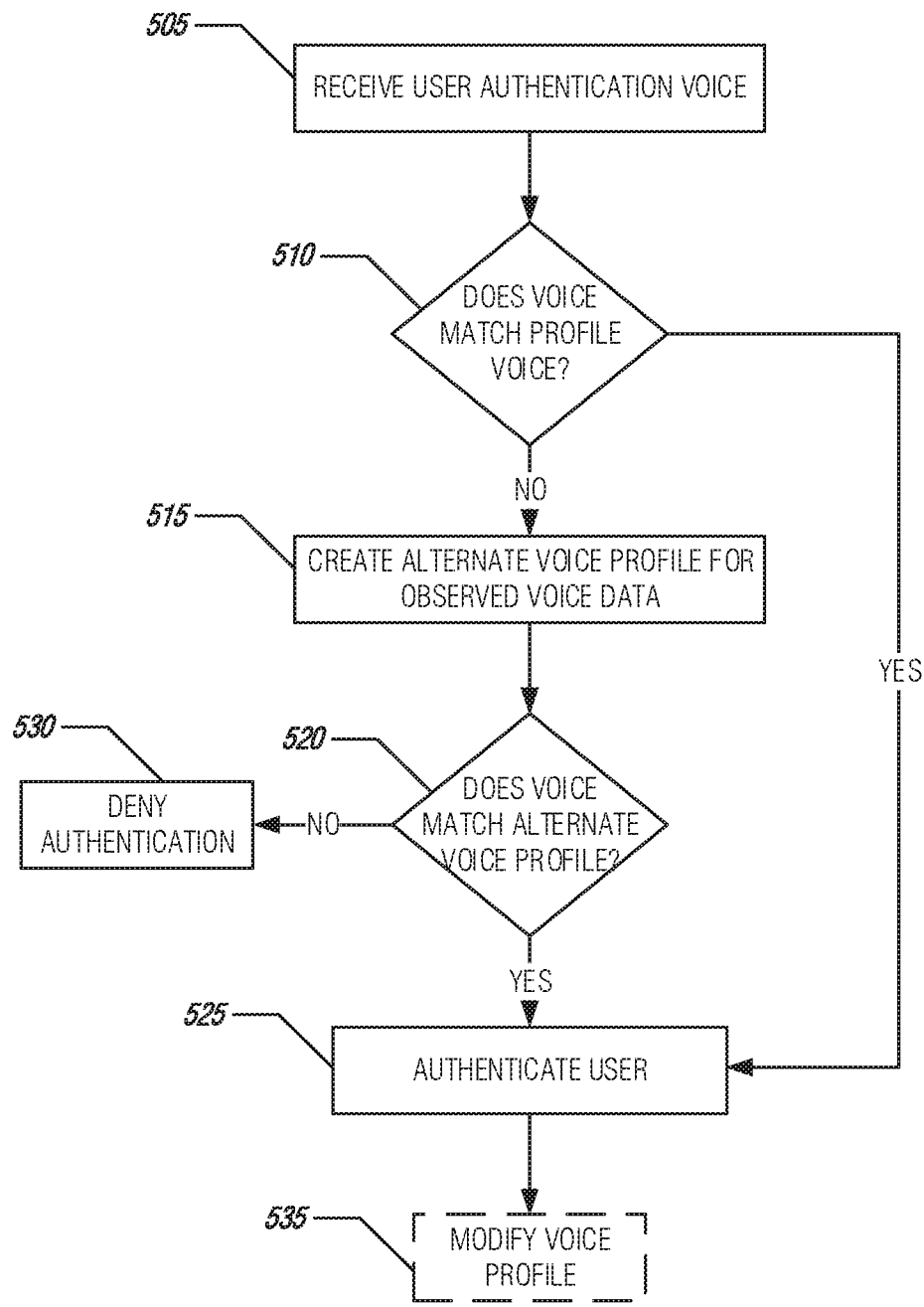
FIG. 5 illustrates a flow diagram of an example of a process for authentication of impaired voices using an alternate voice profile, according to an embodiment.

FIG. 5 illustrates a flow diagram of an example of a process 500 for authentication of impaired voices using an alternate voice profile, according to an embodiment. The process 500 may provide features as described in FIG. 1. An authentication voice of a user may be received (e.g., at operation 505). It may be determined in the authentication voice matches a voice profile of the user (e.g., at decision 510). For example, features (e.g., tone, timbre, cadence, etc.) of the voice included in the voice profile may be compared to features extracted from the authentication voice.

If the authentication voice matches the voice profile, the user may be authenticated (e.g., at operation 525). If the authentication voice does not match the voice profile, an alternate voice profile may be generated using observed voice data (e.g., at operation 515). For example, the user may have opted-in to always-on voice monitoring and connected devices including microphones (e.g., voice-enabled personal assistants, smart thermostats, smart televisions, etc.) may collect voice data of the user over time. The voice data may be used to generate an alternate voice profile of the user (e.g., for a period of time, etc.).

It may be determined in the authentication voice matches the alternate voice profile (e.g., at operation 520). For example, features may be extracted from the alternate voice profile and compared to features extracted from the authentication voice. If it is determined that the authentication voice does not match the alternate voice profile, the authentication request may be denied (e.g., at operation 530). In an example, another authentication criteria may be selected to evaluate the authentication voice. If it is determined that the authentication voice matches the alternate voice profile, the user ay be authenticated (e.g., at operation 525.

In an example, upon authentication of the user, the voice profile of the user may be modified or the alternate voice profile may be added for the user (e.g., at operation 535). For example, the timber of the authentication voice may match the voice profile of the user, but the tone and cadence of the authentication voice did not match the voice profile. The alternate voice profile may be added for the user based on the authentication voice upon authentication of the user using the alternate voice profile. Future authentication requests from the user may compare the authentication voice to the alternate voice profile until the authentication voice no longer matches the alternate voice profile. Thus, the voice profile may be modified or additional voice profiles may be added as the voice of the user changes. This may allow the authentication system to evolve as the user experiences vocal changes.

Figure 6:
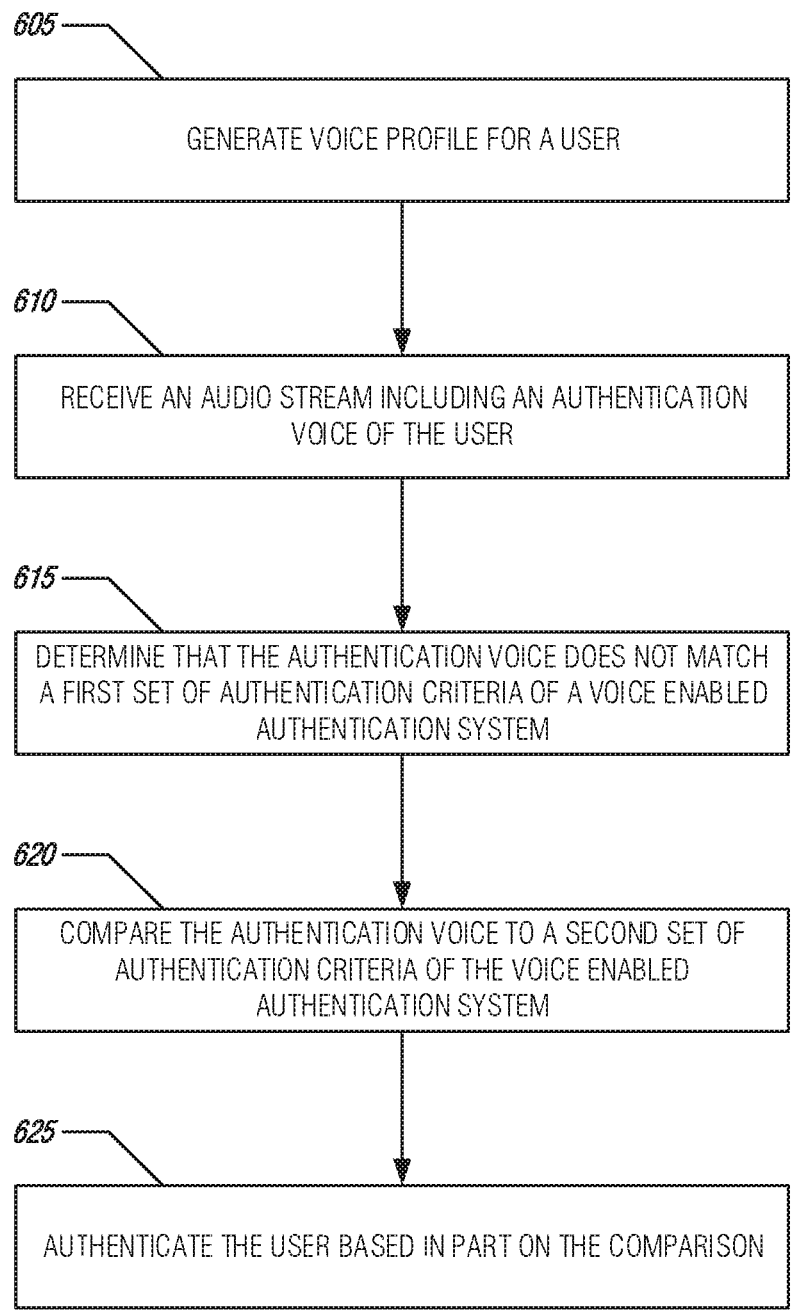
FIG. 6 illustrates an example of a method for authentication of impaired voices, according to an embodiment.

FIG. 6 illustrates an example of a method 600 for authentication of impaired voices, according to an embodiment. The method 600 may provide features as described in FIGS. 1-5. A voice profile may be generated for a user (e.g., at operation 605). The voice profile may include acoustical properties of the initial voice of the user. For example, upon initialization of a voice-enabled authentication system the user may be prompted to create a voice profile by providing a voice sample. In another example, the user may initiate creation of a voice profile by modifying a previously generated voice profile.

An audio stream including an authentication voice of the user may be received by a voice-enabled authentication system (e.g., at operation 610). It may be determined that the authentication voice does not match a first set of authentication criteria of the voice-enabled authentication system (e.g., at operation 615). The first set of authentication criteria may include features of the acoustical properties of the initial voice of the user.

The authentication voice may be compared to a second set of authentication criteria based on the determination that the authentication voice does not match the first set of authentication criteria (e.g., at operation 620). The user may be authenticated based in part of the comparison of the authentication voice to the second set of authentication criteria (e.g., at operation 625). In an example, a new voice profile may be generated for the user upon authentication of the user using the authentication voice. In an example, the second set of authentication criteria includes at least one of a pitch, a tone, a timber, a cadence, and language usage included in the initial voice of the user. In an example, non-voice features may be extracted from the audio stream. The non-voice features may be compared to a set of profile non-voice features included in the voice profile and the authentication of the user may be based in part on the comparison of the non-voice features to the set of non-voice features.

In another example, an inaudible audio tone pattern may be transmitted to a device of the user and the user may be authenticated based in part on receiving a second audio stream including the inaudible audio tone pattern. In yet another example, a secondary authentication request may be transmitted to the user. A response to the secondary authentication request may be received and the user may be authenticated based in part on validation of the response to the secondary authentication request.

In yet another example, a voice filter may be identified based on features extracted from the authentication voice. The voice filter may be applied to the initial voice and a set of acoustical properties may be extracted from the filtered initial voice of the user. The second set of authentication criteria may include the set of acoustical properties. In another example, voice data of the user may be collected over time. Changes may be identified between the initial voice and the voice data collected over time and the second set of authentication criteria may include the identified changes. In an example, an alternate voice profile may be generated for the user using the initial voice and the identified changes and the first authentication criteria may include acoustical properties of the alternate voice profile.

In an example, an authentication level may be determined for the user. The authentication level may be based on the comparison between the authentication voice and the second set of authentication criteria and the authentication level may be determined based on a number of members of the second set of authentication criteria identified in the authentication voice. In an example, initial content may be selected for the user based on the authentication level. A secondary authentication mechanism may be included in the initial selected content when the authentication level is below a threshold. Additional content may be selected for the user upon determination of the authenticity of the user via the secondary authentication mechanism.

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuit sets are a collection of circuits implemented in tangible entities that include hardware (e.g., simple circuits, gates, logic, etc.). Circuit set membership may be flexible over time and underlying hardware variability. Circuit sets include members that may, alone or in combination, perform specified operations when operating. In an example, hardware of the circuit set may be immutably designed to carry out a specific operation (e.g., hardwired). In an example, the hardware of the circuit set may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuit set in hardware via the variable connections to carry out portions of the specific operation when in operation. Accordingly, the computer readable medium is communicatively coupled to the other components of the circuit set member when the device is operating. In an example, any of the physical components may be used in more than one member of more than one circuit set. For example, under operation, execution units may be used in a first circuit of a first circuit set at one point in time and reused by a second circuit in the first circuit set, or by a third circuit in a second circuit set at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse). In an example, the display unit 710, input device 712 and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing; encoding; or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example; a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN); a wide area network (WAN), a packet data network (e.g., the Internet), mobile telephone networks (e.g., cellular networks), Plain Old Telephone (POTS) networks; and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 700, and includes digital or analog communications signals or other intangible medium to facilitate communication of such software.

Additional Notes

The above detailed description includes references to the accompanying drawings; which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover; the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," and "third," etc. are used merely as labels; and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also; in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An authentication system for impaired voice authentication, the system comprising;
    at least one processor; and
    memory including instructions that, when executed by the at least one processor, cause the at least one processor to perform operations to:
        generate an initial voice profile for a user, the initial voice profile including acoustical properties of an initial voice of the user;
        collect a plurality of voice samples of the user over time;
        identify changes between the initial voice and the voice samples collected over time;
        generate an alternate voice profile for the user using the initial voice and the identified changes;
        receive an audio stream including an authentication voice of the user;
        determine that the authentication voice does not match a first set of authentication criteria, the first set of authentication criteria including features of the acoustical properties of the initial voice of the user and features of acoustical properties of the identified changes of the alternate voice profile;
        based on the determination, compare the audio stream to a second set of authentication criteria, wherein the second set of authentication criteria includes additional data elements derived from information included in the initial voice profile;
        determine an authentication level for the user, the authentication level based on a comparison between the authentication voice and the second set of authentication criteria, wherein the authentication level is determined based on a number of members of the second set of authentication criteria identified in the authentication voice; and
        authenticate the user for the authentication level based in part on the comparison between the authentication voice and the second set of authentication criteria and the comparison of the audio stream to the second set of authentication criteria, wherein the comparison of the audio stream to the second set of authentication criteria includes a comparison of the additional data elements derived from the information included in the initial voice profile to data elements of the audio stream.

2. The system of claim 1, further comprising instructions to:
 extract non-voice features from the audio stream; and
 compare the non-voice features to a set of profile non-voice features included in a user profile that includes the initial voice profile, wherein authentication of the user is based in part on the comparison of the non-voice features and the set of profile non-voice features.

3. The system of claim 1, further comprising instructions to:
 transmit an inaudible audio tone pattern to a device of the user, wherein authentication of the user is based in part on receipt of a second audio stream including the inaudible audio tone pattern.

4. The system of claim 1, further comprising instructions to:
 transmit a secondary authentication request to the user;
 receive a response to the secondary authentication request, wherein authentication of the user is based in part on validation of the response to the secondary authentication request.

5. The system of claim 1, wherein the acoustical properties include at least one of a pitch, a tone, a timber, a cadence, and language usage included in the initial voice of the user.

6. The system of claim 1, further comprising instructions to:
 identify a voice filter based on features extracted from the authentication voice;
 apply the voice filter to the initial voice of the user; and
 extract a set of acoustical properties from the filtered initial voice of the user, wherein the second set of authentication criteria includes the set of acoustical properties.

7. The system of claim 1, further comprising instructions to:
 generate, upon authentication of the user, an updated voice profile using the authentication voice.

8. The system of claim 1, further comprising instructions to:
 select initial content for the user based on the authentication level; and
 include, in the initial selected content, a secondary authentication mechanism when the authentication level is below a threshold; and
 upon determination of authenticity of the user via the secondary authentication mechanism, select additional content for the user.

9. The system of claim 1, wherein the second set of authentication criteria includes the identified changes.

10. At least one non-transitory machine readable medium including instructions for impaired voice authentication that, when executed by at least one processor, cause the at least one processor to perform operations to:
 generate initial voice profile for a user, the initial voice profile including acoustical properties of an initial voice of the user;
 collect a plurality of voice samples of the user over time;
 identify changes between the initial voice and the voice samples collected over time;
 generate an alternate voice profile for the user using the initial voice and the identified changes;
 receive an audio stream including an authentication voice of the user;
 determine that the authentication voice does not match a first set of authentication criteria, the first set of authentication criteria including features of the acoustical properties of the initial voice of the user and features of acoustical properties of the identified changes of the alternate voice profile;
 based on the determination, compare the audio stream to a second set of authentication criteria, wherein the second set of authentication criteria includes additional data elements derived from information included in the initial voice profile;
 determine an authentication level for the user, the authentication level based on a comparison between the authentication voice and the second set of authentication criteria, wherein the authentication level is determined based on a number of members of the second set of authentication criteria identified in the authentication voice; and
 authenticate the user for the authentication level based in part on the comparison between the authentication voice and the second set of authentication criteria and the comparison of the audio stream to the second set of authentication criteria, wherein the comparison of the audio stream to the second set of authentication criteria includes a comparison of the additional data elements derived from the information included in the initial voice profile to data elements of the audio stream.

11. The at least one non-transitory machine readable medium of claim 10, further comprising instructions to:
 extract non-voice features from the audio stream; and
 compare the non-voice features to a set of profile non-voice features included in a user profile that includes the initial voice profile, wherein authentication of the user is based in part on the comparison of the non-voice features and the set of profile non-voice features.

12. The at least one non-transitory machine readable medium of claim 10, further comprising instructions to:
 transmit an inaudible audio tone pattern to a device of the user, wherein authentication of the user is based in part on receipt of a second audio stream including the inaudible audio tone pattern.

13. The at least one non-transitory machine readable medium of claim 10, further comprising instructions to:
 transmit a secondary authentication request to the user;
 receive a response to the secondary authentication request, wherein authentication of the user is based in part on validation of the response to the secondary authentication request.

14. The at least one non-transitory machine readable medium of claim 10, further comprising instructions to:
 generate, upon authentication of the user, an updated voice profile using the authentication voice.

15. The at least one non-transitory machine readable medium of claim 10, further comprising instructions to:
 select initial content for the user based on the authentication level; and
 include, in the initial selected content, a secondary authentication mechanism when the authentication level is below a threshold; and
 upon determination of authenticity of the user via the secondary authentication mechanism, select additional content for the user.

16. A method for impaired voice authentication, the method comprising:
 generating an initial voice profile for a user, the initial voice profile including acoustical properties of an initial voice of the user;
 collecting a plurality of voice samples of the user over time;

identifying changes between the initial voice and the voice samples collected over time;

generating an alternate voice profile for the user using the initial voice and the identified changes;

receiving, by a voice-enabled authentication system, an audio stream including an authentication voice of the user;

determining that the authentication voice does not match a first set of authentication criteria of the voice-enabled authentication system, the first set of authentication criteria including features of the acoustical properties of the initial voice of the user and features of acoustical properties of the identified changes of the alternate voice profile;

based on the determination, comparing the audio stream to a second set of authentication criteria of the voice-enabled authentication system, wherein the second set of authentication criteria includes additional data elements derived from information included in the initial voice profile;

determining an authentication level for the user, the authentication level based on a comparison between the authentication voice and the second set of authentication criteria, wherein the authentication level is determined based on a number of members of the second set of authentication criteria identified in the authentication voice; and authenticating the user for the authentication level based in part on the comparison between the authentication voice and the second set of authentication criteria and the comparison of the audio stream to the second set of authentication criteria, wherein the comparison of the audio stream to the second set of authentication criteria includes a comparison of the additional data elements derived from the information included in the initial voice profile to data elements of the audio stream.

17. The method of claim 16, further comprising:

extracting non-voice features from the audio stream; and comparing the non-voice features to a set of profile non-voice features included in a user profile including the initial voice profile, wherein authenticating the user is based in part on the comparison of the non-voice features and the set of profile non-voice features.

18. The method of claim 16, further comprising:

transmitting an inaudible audio tone pattern to a device of the user, wherein authenticating the user is based in part on receiving a second audio stream including the inaudible audio tone pattern.

19. The method of claim 16, further comprising:

identifying a voice filter based on features extracted from the authentication voice;

applying the voice filter to the initial voice of the user; and extracting a set of acoustical properties from the filtered initial voice of the user, wherein the second set of authentication criteria includes the set of acoustical properties.

20. The method of claim 16, further comprising:

selecting initial content for the user based on the authentication level; and including, in the initial selected content, a secondary authentication mechanism when the authentication level is below a threshold; and upon determining authenticity of the user via the secondary authentication mechanism, selecting additional content for the user.

* * * * *